US012063727B2

(12) United States Patent
Kong et al.

(10) Patent No.: US 12,063,727 B2
(45) Date of Patent: Aug. 13, 2024

(54) TUBULAR LED LAMP AND A CIRCUIT USED FOR THE LAMP

(71) Applicant: SIGNIFY HOLDING B.V., Eindhoven (NL)

(72) Inventors: Deyong Kong, Shanghai (CN); Xin Liu, Shanghai (CN); Feng Ju, Shanghai (CN); Liwei Sun, Shanghai (CN); Han Lu, Shanghai (CN); Jing Yang, Shanghai (CN); Yuanqiang Liu, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/928,111

(22) PCT Filed: Jun. 15, 2021

(86) PCT No.: PCT/EP2021/066023

§ 371 (c)(1),
(2) Date: Nov. 28, 2022

(87) PCT Pub. No.: WO2021/254985

PCT Pub. Date: Dec. 23, 2021

(65) Prior Publication Data

US 2024/0107644 A1 Mar. 28, 2024

(30) Foreign Application Priority Data

Jun. 18, 2020 (WO) ................ PCT/CN2020/096781
Aug. 17, 2020 (EP) ..................................... 20191367
Aug. 20, 2020 (EP) ..................................... 20191890

(51) Int. Cl.
*H05B 45/50* (2022.01)
*H05B 45/10* (2020.01)

(52) U.S. Cl.
CPC ............. *H05B 45/50* (2020.01); *H05B 45/10* (2020.01)

(58) Field of Classification Search
None
See application file for complete search history.

(56) References Cited

U.S. PATENT DOCUMENTS 9,769,901 B1 * 9/2017 Vaughan ............ H05B 45/3575
2016/0174311 A1 * 6/2016 Hsia ..................... H05B 45/375
315/201

(Continued)

FOREIGN PATENT DOCUMENTS

DE 102013108775 A1 2/2015
WO 2018097858 A1 5/2018
WO 2020035479 A1 2/2020

*Primary Examiner* — Anh Q Tran

(57) ABSTRACT

A tubular LED lamp to be used with an external electronic power controlling device which is adapted to provide an input voltage to the lamp, comprising: a LED unit; a driving circuit for the LED unit; and a safety detection circuit adapted to detect whether the tubular LED lamp is correctly connected to an external lamp fixture; characterized in that further comprising: a holding current providing circuit adapted to provide a holding current through the electronic controlling device so as to maintain the electronic controlling device to be conductive; and a controlling circuit adapted to synchronize the safety detection circuit with the holding current providing circuit such that the safety detection circuit is adapted to carry out the detection when the hold current providing circuit is adapted to provide the holding current and the electronic controlling device is conductive; wherein the controlling circuit is adapted to deactivate the holding current providing circuit and the safety detection circuit after the detection in one cycle of the input voltage, and re-activate and deactivate them in a later cycle.

10 Claims, 2 Drawing Sheets

(56) References Cited

U.S. PATENT DOCUMENTS

| | | | | |
|---|---|---|---|---|
| 2018/0279429 | A1 | 9/2018 | Sadwick | |
| 2018/0324925 | A1 | 11/2018 | Lu et al. | |
| 2022/0061142 | A1* | 2/2022 | Wu | F21V 25/04 |

* cited by examiner

TUBULAR LED LAMP AND A CIRCUIT USED FOR THE LAMP

CROSS-REFERENCE TO PRIOR APPLICATIONS

This application is the U.S. National Phase application under 35 U.S.C. § 371 of International Application No. PCT/EP2021/066023, filed on Jun. 15, 2021, which claims the benefits of European Patent Application No. 20191890.1, filed on Aug. 20, 2020, European Patent Application No.

20191367.0, filed on Aug. 17, 2020 and Chinese Patent Application PCT/CN2020/096781, filed on Jun. 18, 2020. These applications are hereby incorporated by reference herein.

FIELD OF THE INVENTION

The present invention relates to the field of LED lighting units, and in particular, to rectifying arrangements for tubular LED lamp.

BACKGROUND OF THE INVENTION

DE102013108775A1 discloses a LED lamp tube with a capability of detecting a ground fault at the touch of at least one of the pin contacts, wherein the touch is by a user/human. US20180324925 of the applicant also discloses a more specific topology in detecting whether there is human impedance between the power supply and the tubular LED lamp. WO2018097858A1 discloses a linear LED lamp with a current sensing device, originally for controlling a current flow into an LED array, being used in a way that it also detects an electrical shock current. This safety function becomes more and more popular in tubular LED lamps to meet the safety requirement/regulation.

There is another trend of making LED lamp dimmable, including the tubular LED lamp, so as to save energy in case of needed. LED bulb or luminaire that is compatible with TRIAC dimmer exists for years. But for tubular LED lamp with the ground fault/human touch detection function, it is not directly compatible with TRIAC dimmer since the TRIAC dimmer requires special operating current that may interfere with the human touch detection of the tubular LED lamp.

SUMMARY OF THE INVENTION

The goal of the invention is providing a tubular LED lamp with both a reliable human touch detection function and a compatibility with an electronic switch such as a TRIAC dimmer.

As known in the art, the electronic switch such as TRIAC dimmer requires a minimum operating current. For example the TRIAC in the TRIAC dimmer needs a holding current to keep it on after it has been turned on (fire). The basic idea of embodiments of the invention is providing the holding current in synchronization with the safety detection function so that the safety detection function is able to access the input voltage electrically, so as to determine whether the lamp has been correctly connected to the lamp fixture, preferably to determine whether there is human impedance in between. Even further, the basic idea of the embodiments of the invention is deactivating the holding current and safety detection, after the detection in one cycle, and re-activating the holding current and safety detection in a later cycle, so the detection can be carried out for several cycles to confirm the safe connection, meanwhile the detection is not continuous. The advantage is reducing power loss of the detection, and reducing the time-averaged current (including holding current and detection current) flowing through a potentially present human so the human is safer under this detection process.

According to a first aspect of the invention, A tubular LED lamp to be used with an external electronic power controlling device which adapted to provide an input voltage to the lamp, comprising:

- a LED unit;
- a driving circuit for the LED unit;
- a safety detection circuit to carry out a safety detection to detect whether the tubular LED lamp is correctly connected to an external lamp fixture;
- characterized in that further comprising, for each cycle of the input voltage:
- a holding current providing circuit to provide a holding current through the electronic controlling device so as to maintain the electronic controlling device to be conductive;
- a controlling circuit to synchronize the safety detection circuit with the holding current providing circuit such that the safety detection circuit is adapted to carry out the safety detection when the hold current providing circuit is adapted to provide the hold current and the electronic controlling device is conductive;
- wherein the controlling circuit is to deactivate the holding current providing circuit and the safety detection circuit and after the safety detection in one cycle of the input voltage, and re-activate and deactivate them in a later cycle.

In short, the holding current providing circuit and the safety detection circuit does not work continuously but in a synchronized and pulsed manner in successive cycles of the input voltage. This reduces the time duration when the holding current and the safety detection current flows, reducing both the power loss for safety detection and the average current through the potential present human body thereby make the human safer.

In a further embodiment, the tubular LED lamp is to be used with a TRIAC dimmer circuit and further comprises a triggering circuit to trigger the electronic controlling device to become conductive in accordance with cycles of the input voltage, and the triggering circuit is adapted to draw a firing current to charge an energy storage component in the TRIAC dimmer to reach the conducting voltage threshold of a TRIAC in the TRIAC dimmer, and the holding current providing circuit is adapted to provide the holding current that is adapted to keep the TRIAC in the TRIAC dimmer to maintain conductive.

This embodiment is specifically for being compatible with TRIAC dimmer. The tubular LED lamp draws firing current as well as the holding current for the TRIAC in the TRIAC dimmer so the TRIAC dimmer can turn on and keep on normally.

In a further embodiment, the controlling circuit is adapted to detect a voltage leading edge to determine that the electronic controlling device has become conductive, and activate the holding current providing circuit and the safety detection circuit.

This embodiment is designed for leading edge dimmer, when the dimmer conducts, the voltage to the tubular lamp would rise quickly so this can be used for indicating that the dimmer has been turned on.

In one embodiment, the controlling circuit is adapted to activate the safety detection circuit after activating the holding current providing circuit by a delay.

This delay can avoid some oscillations or unstable current to influence the safety detection.

In a further embodiment, the triggering circuit is adapted to accumulate a certain energy in triggering the electronic device, and the holding current providing circuit is adapted to also discharge the triggering circuit within the delay so as to avoid the certain energy flow to the safety detection circuit and allow the triggering circuit to trigger the electronic device in a later cycle of the input voltage.

The triggering circuit is often implemented by an RC circuit to draw the firing current. In one hand, the RC circuit needs to be discharged at least partially so in next cycle it can trigger the TRIAC again; and in the other hand, the energy in the RC circuit should not avoid the safety detection. Therefore the holding current providing circuit, acting as a bleeder, also discharges the RC circuit to avoid the energy in the RC circuit influence the safety detection circuit, like flowing through it and causing inaccurate detection.

In a further embodiment, the holding current providing circuit and the safety detection circuit comprises a first switch and a second switch respectively.

The advantage of having two respective switches is that they are individually controlled and this is easier to implement the controlling.

In a further embodiment, the holding current providing circuit is adapted to provide the holding current via the LED unit. In this embodiment, in circuit level, the holding current providing circuit can share a current path through the LED unit thus saves a dedicated current path/components, and saves some cost.

In a further embodiment, the safety detection circuit is adapted to close the second switch with a certain impedance, and detect a detection current through the second switch exceeding a certain threshold to determine that the tubular LED lamp is correctly connected to an external lamp fixture. Preferably, the certain threshold is at a level that the detection current cannot reach if a human impedance is in series with the lamp with respect to the input voltage.

This provides a reliable way to detect whether the human impedance is in series with the tubular lamp. Since human impedance, if exists, increases the total impedance, the detection current is less and cannot reach a high level; otherwise the total impedance is small and the detection current can be high.

In one embodiment, the first switch and the second switch are in parallel such that the holding current and the detection current are superimposed and detected by the safety detection circuit which is adapted to count out the holding current when detects whether the tubular LED lamp is correctly connected to an external lamp fixture.

The safety detection circuit detects a superimposed current, for circuit simplicity, but need to exclude the holding current. This can be implemented by increasing the above certain threshold by the amplitude of the holding current.

In one embodiment, the controlling circuit is adapted to activate the safety detection circuit for several cycles and operate the driving circuit when the safety detection circuit detects that the tubular lamp is correctly connected to the external lamp fixture for several times.

This embodiment repeats the detection for serval times respectively in several cycles, increasing the reliability of detection.

In one embodiment, the tubular LED lamp further comprising a safety switch between the driving circuit and the input voltage, the controlling circuit is adapted to close the safety switch so as to operate the driving circuit.

This embodiment provides a safety mechanism to activate the driving circuit to avoid the driving circuit drawing human-risky operating current when it is not safe.

In a second aspect of the invention, it is proposed a circuit, which includes the essential dimmer compatibility and safety detection function, to be used to a tubular LED lamp and an external electronic power controlling device. The circuit comprising:

a safety detection circuit to detect whether the tubular LED lamp is correctly connected to an external lamp fixture;

characterized in that further comprising, for each cycle of the input voltage:

a holding current providing circuit to provide a holding current through the electronic controlling device so as to maintain the electronic controlling device to be conductive;

a controlling circuit to synchronize the safety detection circuit with the holding current providing circuit such that the safety detection circuit is adapted to carry out the detection when the hold current providing circuit is adapted to provide the holding current and the electronic controlling device is conductive;

wherein the controlling circuit is to deactivate the holding current providing circuit and the safety detection circuit after the detection in one cycle of the input voltage, and re-activate and deactivate them in a later cycle of the input voltage.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
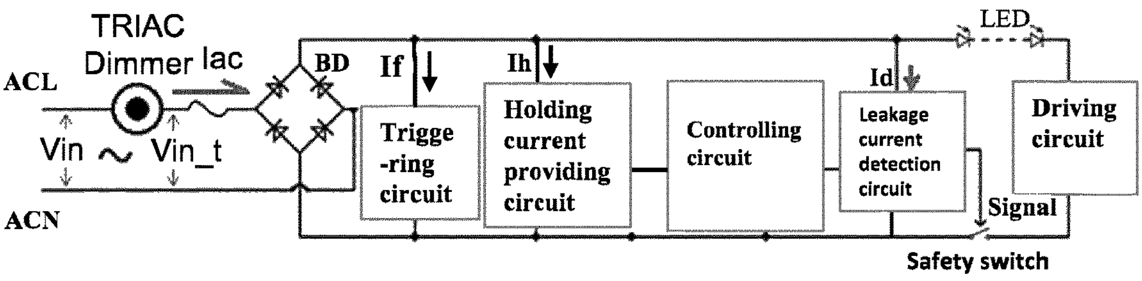
FIG. 1 is a block diagram illustrating components of an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Figure 2:
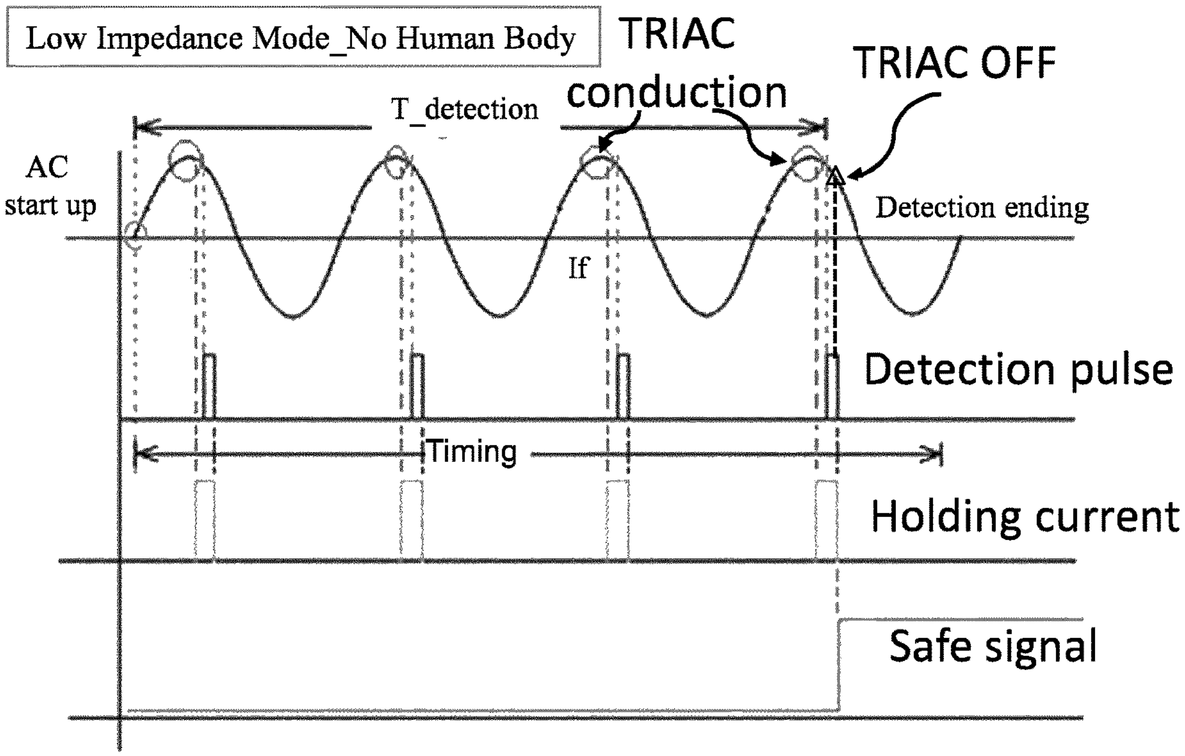
FIG. 2 provides waveforms showing the synchronized and pulsed holding current and safety detection in cycles of the input voltage.

As shown in FIG. 1, a basic embodiment of the tubular LED lamp to be used with an external electronic power controlling device (in FIG. 1 it is a TRIAC dimmer) which adapted to provide an input voltage Vin which is AC to the lamp, comprising:

a LED unit, shown as LED in FIG. 1;

a driving circuit for the LED unit, which could be a switched mode power converter, a linear converter, or just a direct electrical connection between the LED and the input voltage; and a safety detection circuit to detect whether the tubular LED lamp is correctly connected to an external lamp fixture, and in FIG. 1 it is shown as a leakage current detection circuit;

characterized in that further comprising, also as shown in FIG. 2, for each cycle of the input voltage:

a holding current providing circuit to provide a holding current through the electronic controlling device so as to maintain the electronic controlling device to be conductive; and a controlling circuit to synchronize the safety detection circuit with the holding current providing circuit such that the safety detection circuit is adapted to carry out the detection when the hold current providing circuit is adapted to provide the holding current and the electronic controlling device is conductive.

As shown in FIG. 2, the controlling circuit is to deactivate the holding current providing circuit and the safety detection circuit after the detection in one cycle of the input voltage, and re-activate and deactivate them in a later cycle.

More specifically, making a LED lamp to be compatible with a TRIAC dimmer concerns much about properly making and keeping the TRIAC dimmer on. For making it on, the tubular LED lamp may have a triggering circuit. The triggering circuit could be implemented as an RC circuit to provide a path of firing current of the TRIAC. One resistor and one capacitor are in series connection at the output of an optional bridge rectifier BD of the tubular LED lamp. The TRIAC dimmer is originally in high impedance state wherein the TRIAC is turned off After the zero crossing of the AC mains voltage, as shown in the top curve in FIG. 2, the AC mains voltage charges an internal energy storage component of the TRIAC dimmer via the triggering circuit of the invention and the charging current via the triggering circuit can also be called as firing current If. When the voltage of the energy storage component reaches a threshold to turn on the TRIAC, the TRIAC is turned on and the TRIAC dimmer become low impedance to conduct the input voltage Vin to the tubular LED lamp. This is shown by the cycle on the AC mains curve. As shown, the TRIAC dimmer turns on around 90 degree phase which probably means that the TRIAC dimmer's dimming position is set at a 50% brightness set level. It could be understood that the firing/conducting of the TRIAC dimmer may vary depending on the dimming position of the dimmer as well as the capability of the triggering circuit in drawing the firing current. Anyway, the TRIAC dimmer is turned on.

A voltage detection (not shown) in the tubular LED lamp can sense a sharp incoming of the input voltage or a voltage leading edge to the tubular lamp, and is aware that the TRIAC dimmer is turned on. Before the tubular LED lamp starts to operate, it must carry out the safety detection.

So, in order to carry out the safety detection, the embodiment of the invention proposes that: after the conduction of the TRIAC dimmer, the holding current providing circuit is adapted to provide the holding current Ih that is adapted to keep the TRIAC in the TRIAC dimmer to maintain conductive. This is shown in the third waveform in FIG. 2. Also, within a time period that the holding current is present, meaning the TRIAC dimmer is conducting, the safety detection circuit carries out the detection. This is shown in the second waveform in FIG. 2.

The safety detection, more specifically the ground fault detection or pin safety detection, is to determine that there is no human impedance between the Vin and the lamp, which could be a user touching one side pin of the lamp. The pin safety detection has been described in DE102013108775A1 and US20180324925. The basic principle is detecting the amplitude of the current with a detection impedance in the loop, before the driver operates: if the current Id is large enough, meaning the impedance in the loop is small (or only the detection impedance is there), probably no existence of a big impedance of human; if the current Id is small, meaning the impedance in the loop is large, probably there is an additional impedance of human. If it determines that there is no human, the tubular LED lamp can work and the driver is enabled with a low impedance; otherwise the lamp does not work and the driver is not enabled still and stay in high impedance state, to limit the current and prevent electrically shock to human.

After the detection of a short period, the detection can stop in this cycle. Accompanying the stop of the detection, the hold current providing circuit can also stop drawing the holding current Ih. The TRIAC dimmer is turned off afterwards, as shown by the triangle in the first curve, reducing the current to the potential human body as well as power loss. The controlling circuit would re-activate and deactivate the holding current providing circuit and the safety detection circuit in a later cycle or cycles, as shown in FIG. 2. Of course, the triggering circuit also turns on the TRIAC dimmer in a later cycle or cycles before the re-activation of the holding current providing circuit.

In one embodiment, the triggering circuit is adapted to accumulate a certain energy in triggering the electronic device, like the capacitor in the RC circuit is charged. The holding current providing circuit is adapted to also discharge the triggering circuit within a delay so as to avoid the certain energy flow to the safety detection circuit and allow the triggering circuit to trigger the electronic device in a later cycle of the input voltage. The controlling circuit activates the safety detection circuit after activating the holding current providing circuit by the delay. This can be seen in FIG. 2. Alternatively, the energy in the triggering circuit is used by the controlling circuit, the holding current providing circuit and the safety detection circuit, and so in a later cycle it can draw the sufficient firing current via the TRIAC dimmer again.

For a more reliable decision, the controlling circuit is adapted to activate the safety detection circuit and do detection for several cycles, as shown in FIG. 2, and operate the driving circuit when the safety detection circuit detects that the tubular lamp is correctly connected to the external lamp fixture for several times. As shown in the bottom curve, a safe signal is pulled high after four times of detection that there is no human touch.

As shown in FIG. 1, the tubular LED lamp further comprising a safety switch between the driving circuit and the input voltage, the controlling circuit is adapted to close the safety switch so as to close the power loop to the driving circuit. The safe signal can be used to enable/close the safety switch. After the tubular LED lamp is working, the safety detection circuit can be disabled. The holding current providing circuit may also be disabled. Alternatively, if the driving circuit's current is so small for dimming purpose and cannot reach the holding current, the holding current providing circuit can supplement for the lack of holding current. Also, if the driving circuit can trigger the TRIAC of the dimmer, the triggering circuit can be disabled too; otherwise, it can be used for supplementing the firing current to make the TRIAC properly turned on.

Figure 3:
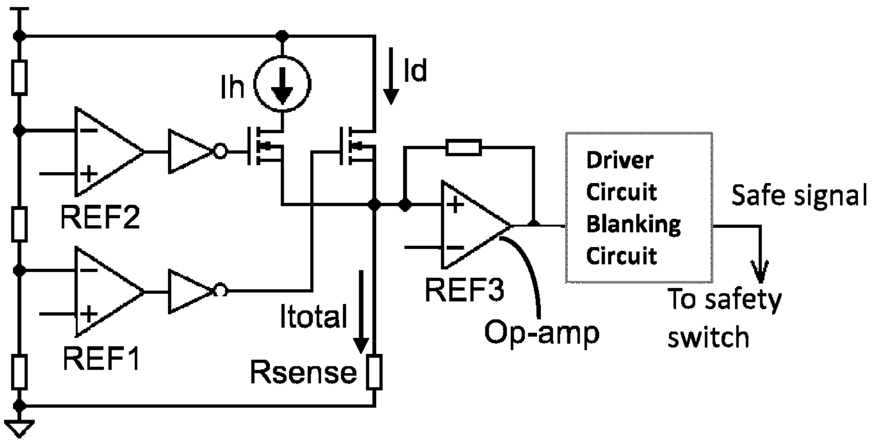
FIG. 3 is a circuit diagram illustrating an embodiment of the holding current providing circuit and the safety detection circuit.

FIG. 3 shows a circuit diagram including the holding current providing circuit and the detection circuit, which comprises a respective first switch and a second switch. Firstly, the holding current providing circuit turns on the first switch, shown as a MOSFET, in series with the current source Ih so as to draw the holding current Ih. After a delay mentioned above, the second switch, also shown as a MOSFEET, is turned on to conduct the Id current that is to be detected and it is amplitude determines whether there is ground leakage (via human). If the current is small, the driver circuit blanking circuit would consider there is human touch and blank the driving/operation of the tubular LED lamp, not output the safe signal; otherwise it outputs the safe signal. In the figure the holding current providing circuit is shown as different from the LED unit. However, this is just an example. In another embodiment, the holding current providing circuit is adapted to provide the holding current via the LED unit, in other words, the safety switch and the driving circuit can be activated to draw a small current from the input in the sense of providing the holding current. Of course, the safety switch and the driving circuit are not operated in full power in the sense of normal illumination/driving of the LED unit.

To make the circuit simple, the first switch and the second switch are connected in parallel, and the holding current Ih and detection current Id are superimposed as current Itotal, sensed by a sense resistor Rsense. The safety detection circuit is adapted to count out the holding current when detects whether the tubular LED lamp is correctly connected to an external lamp fixture. More specifically, the reference of the Op-amp, which is used in comparing the Itotal, should be the holding current Ih plus the threshold of safety.

Figure 4:
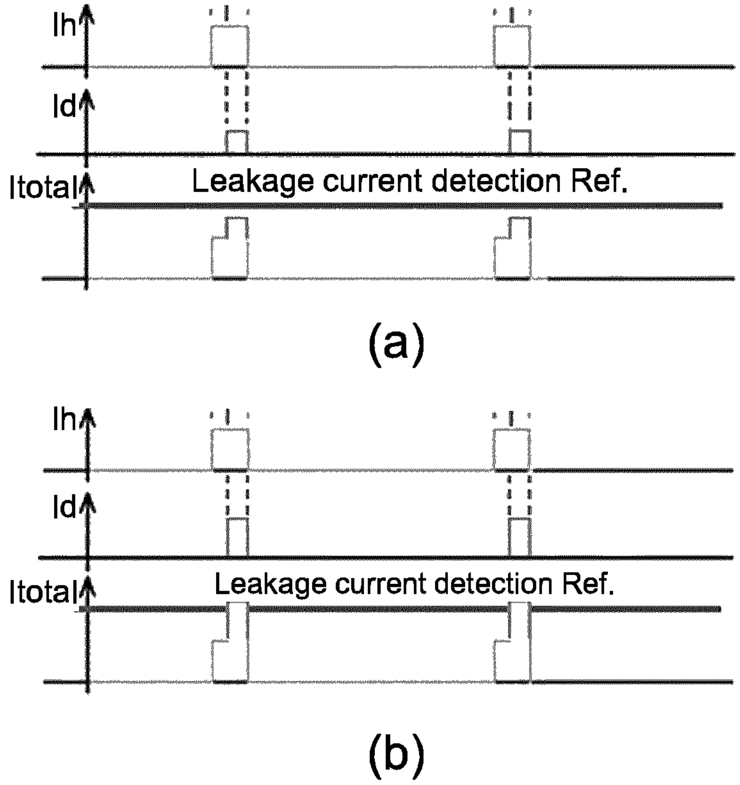
FIG. 4 shows the waveform of the currents in FIG. 3 in both cases of determination of being safe and unsafe.

FIG. 4 shows two different current waveforms in case of human body presence and no-presence. Ih is the holding current and Id is the detection current (appears later than the holding current by a delay, as mentioned above). In the upper curve (a), the Itotal is less than a leakage current detection ref., meaning the current is small and there is probably human body impedance in series with the lamp; in the lower curve (b), the Itotal is larger than the leakage current detection ref., meaning the current is small and there is probably no human body impedance so it is safe to turn on the driving circuit.

The above embodiment takes the TRIAC dimmer as an example of the external electronic power controlling device to describe the invention. Those skilled in the art understand that there are other kinds of electronic power controlling device like smart wall panel or switch that also needs a minimum operating/holding current. The embodiment of the invention is also applicable for those devices.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A tubular LED lamp to be used with an external electronic power controlling device which is adapted to provide an input voltage to the lamp, comprising:

a LED unit;

a driving circuit for the LED unit; and a safety detection circuit adapted to carry out a safety detection to detect whether the tubular LED lamp is correctly connected to an external lamp fixture;

a holding current providing circuit adapted to provide a holding current through the electronic controlling device so as to maintain the electronic controlling device to be conductive; and a controlling circuit adapted to synchronize the safety detection circuit with the holding current providing circuit such that the safety detection circuit is adapted to carry out the safety detection when the hold current providing circuit is adapted to provide the holding current and the electronic controlling device is conductive;

wherein the controlling circuit is adapted to deactivate the holding current providing circuit and the safety detection circuit after the safety detection in one cycle of the input voltage, and re-activate and deactivate them in a later cycle.

2. The tubular LED lamp according to claim 1, to be used with a TRIAC dimmer circuit, and the tubular LED lamp further comprises a triggering circuit adapted to trigger the electronic controlling device to become conductive in accordance with cycles of the input voltage, wherein the triggering circuit is adapted to draw a firing current to charge an energy storage component in the TRIAC dimmer to reach the conducting voltage threshold of a TRIAC in the TRIAC dimmer, and the holding current providing circuit is adapted to provide the holding current that is adapted to keep the TRIAC in the TRIAC dimmer to maintain conductive.

3. The tubular LED lamp according to claim 1, wherein the controlling circuit is adapted to detect a voltage leading edge to determine that the electronic controlling device has become conductive, and activate the holding current providing circuit and the safety detection circuit.

4. The tubular LED lamp according to claim 2, wherein the controlling circuit is adapted to activate the safety detection circuit after activating the holding current providing circuit by a delay.

5. The tubular LED lamp according to claim 4, wherein the triggering circuit is adapted to accumulate a certain energy in triggering the electronic device, and the holding current providing circuit is adapted to also discharge the triggering circuit within the delay so as to avoid the certain energy flow to the safety detection circuit and allow the triggering circuit to trigger the electronic device in a later cycle of the input voltage.

6. The tubular LED lamp according to claim 5, wherein the holding current providing circuit and the safety detection circuit comprises a first switch and a second switch respectively, and/or the holding current providing circuit is adapted to provide the holding current via the LED unit.

7. The tubular LED lamp according to claim 6, wherein the safety detection circuit is adapted to close the second switch with a certain impedance, and detect a detection current through the second switch exceeding a certain threshold to determine that the tubular LED lamp is correctly connected to an external lamp fixture.

8. The tubular LED lamp according to claim 6, wherein the first switch and the second switch are in parallel such that the holding current and the detection current are superimposed and detected by the safety detection circuit which is adapted to count out the holding current when detects whether the tubular LED lamp is correctly connected to an external lamp fixture.

9. The tubular LED lamp according to claim 7, wherein the certain threshold is at a level that the detection current cannot reach if a human impedance is in series with the lamp with respect to the input voltage.

10. The tubular LED lamp according to claim 1, wherein the controlling circuit is adapted to activate the safety detection circuit for several cycles and operate the driving circuit when the safety detection circuit detects that the tubular lamp is correctly connected to the external lamp fixture for several times, wherein the tubular LED lamp further comprising a safety switch between the driving circuit and the input voltage, the controlling circuit is adapted to close the safety switch so as to operate the driving circuit.

* * * * *